(12) United States Patent
Chang et al.

(10) Patent No.: US 8,153,272 B1
(45) Date of Patent: *Apr. 10, 2012

(54) COMPOSITE ARTICLES MADE BY JOINING BRASS PART AND SILICON CARBIDE CERAMIC PART

(75) Inventors: Hsin-Pei Chang, New Taipei (TW); Wen-Rong Chen, New Taipei (TW); Huann-Wu Chiang, New Taipei (TW); Cheng-Shi Chen, New Taipei (TW); Wen-Feng Hu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/172,280

(22) Filed: Jun. 29, 2011

(30) Foreign Application Priority Data

Dec. 14, 2010 (CN) .......................... 2010 1 0587456

(51) Int. Cl.
*B32B 15/04* (2006.01)
*B32B 15/20* (2006.01)
*B32B 18/00* (2006.01)

(52) U.S. Cl. ........ 428/621; 428/627; 428/652; 428/674; 428/680; 428/450

(58) Field of Classification Search ................. 428/610, 428/621, 627, 650, 652, 654, 674, 680, 446, 428/450
See application file for complete search history.

(56) References Cited

U.S. PATENT DOCUMENTS 5,161,908 A * 11/1992 Yoshida et al. ................. 403/29
2004/0149813 A1 * 8/2004 Weihs et al. ................... 228/246

OTHER PUBLICATIONS

Chang et al, Claim Listing in U.S. Appl. No. 13/166,344, Jun. 2011.*

* cited by examiner

*Primary Examiner* — Michael Lavilla
(74) *Attorney, Agent, or Firm* — Altis Law Group, Inc.

(57) ABSTRACT

A process for joining a brass part and a silicon carbide ceramic part comprising: providing a brass part, a SiC ceramic part, a Al foil and a Ni foil; placing the SiC ceramic part, the Al foil, the Ni foil, and the brass part into a mold, the Al foil and the Ni foil located between the SiC ceramic part and the brass part, the Al foil abutting against the SiC ceramic part, the Ni foil abutting against the brass part and the Al foil; placing the mold into a chamber of an hot press sintering device, heating the chamber and pressing the brass part, the SiC ceramic part, the Al foil, and the Ni foil at least until the brass part, the SiC ceramic part, the Al foil and the Ni foil form a integral composite article.

5 Claims, 2 Drawing Sheets

COMPOSITE ARTICLES MADE BY JOINING BRASS PART AND SILICON CARBIDE CERAMIC PART

CROSS-REFERENCE TO RELATED APPLICATIONS

The disclosures of the three listed applications are incorporated by reference in this instant application. All listed applications have the same assignee.

| Ser. No. | Attorney Docket No. | Title | Inventors | Current Status |
|---|---|---|---|---|
| 13/172,264 | US36181 | PROCESS FOR JOINING STAINLESS STEEL PART AND ZIRCONIA CERAMIC PART AND COMPOSITE ARTICLES MADE BY SAME | HSIN-PEI CHANG et al. | Pending |
| 13/172,271 | US36184 | PROCESS FOR JOINING BRASS PART AND SILICON CARBIDE CERAMIC PART AND COMPOSITE ARTICLES MADE BY SAME | HSIN-PEI CHANG et al. | Pending |
| 13/172,274 | US36185 | PROCESS FOR JOINING BRONZE PART AND SILICON CARBIDE CERAMIC PART AND COMPOSITE ARTICLES MADE BY SAME | HSIN-PEI CHANG et al. | Pending |

BACKGROUND

1. Technical Field

The present disclosure relates to a process for joining a metal part and a ceramic part, especially to a process for joining a brass part and a silicon carbide ceramic part, and a composite article made by the process.

2. Description of the Related Art

Brass has excellent corrosion resistance and good conductivity compared to steel, and is widely applied in the components manufacturing industry. However, unlike silicon carbide, brass cannot maintain its physical properties when used in an environment of high temperature and strong corrosives. Therefore, a composite article comprising a brass part and a silicon carbide ceramic part has a desirable performance of high temperature resistance, corrosion resistance, abrasion resistance, and usable in extreme environments.

A typical process for joining brass and silicon carbide ceramic is by positioning one or more separately formed intermediate connecting layers between brass and silicon carbide ceramic. However, due to differing rates of heat expansion and the separate nature of the intermediate connecting layers, the bond between the brass and the silicon carbide ceramic is not as stable as desired.

Therefore, there is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the exemplary process for joining brass part and silicon carbide ceramic part, and composite article made by the process. Moreover, in the drawings like reference numerals designate corresponding parts throughout the several views. Wherever possible, the same reference numbers are used throughout the drawings to refer to the same or like elements of an embodiment.

DETAILED DESCRIPTION

Figure 1:
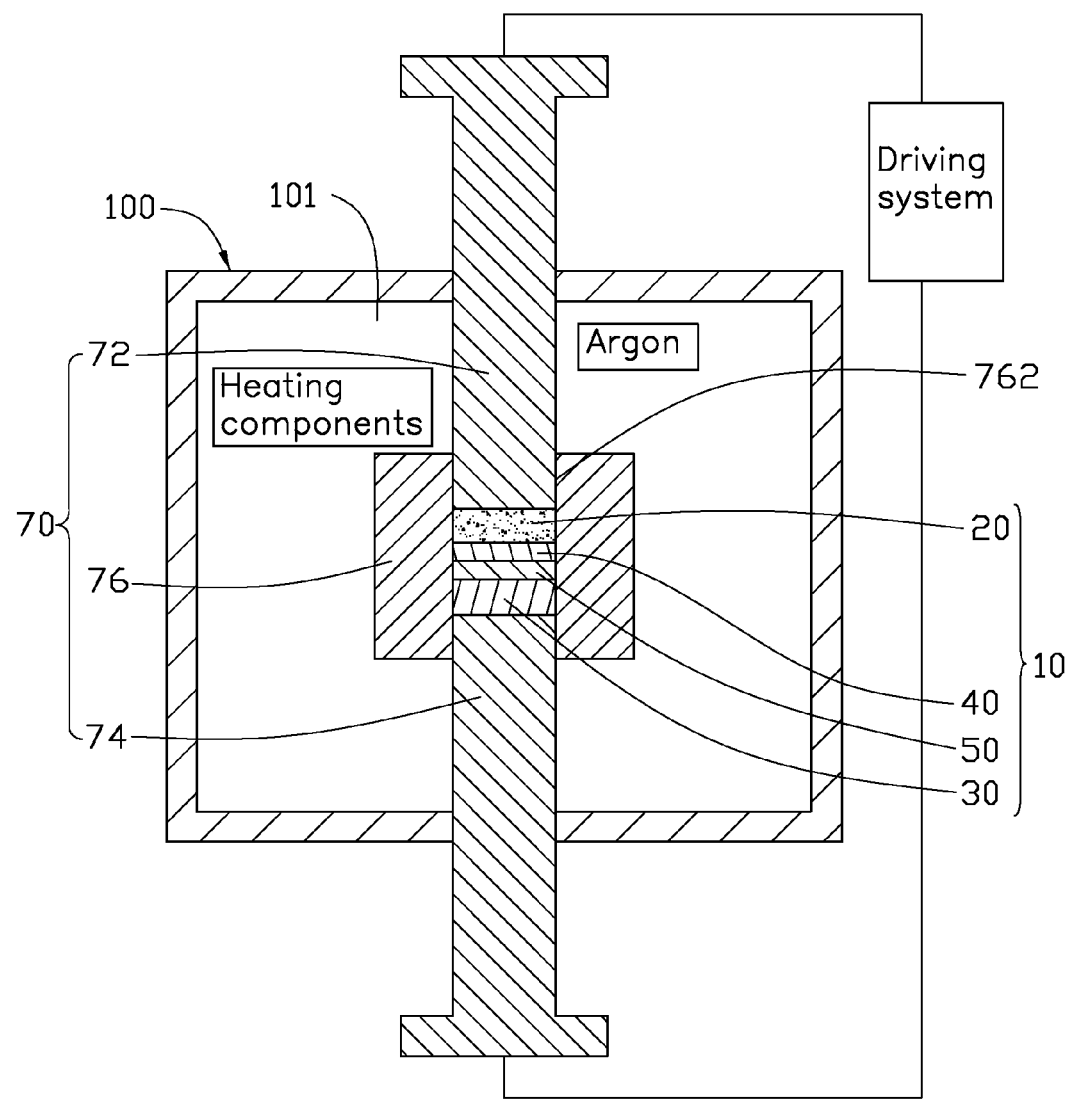
FIG. 1 is a schematic cross-sectional view of an example of a hot press sintering device for implementing the present process.

Referring to FIG. 1, an exemplary process for joining a brass part and a silicon carbide ceramic part, may includes the following steps:

A silicon carbide (SiC) ceramic part 20, a aluminum (Al) foil 40, an nickel (Ni) foil 50 and a brass part 30 are provided. The Al foil 40 and the Ni foil 50 are used as a joining medium between the SiC ceramic part 20 and the brass part 30. Each of the Al foil 40 and the Ni foil 50 has a thickness in a range from about 0.1 millimeter (mm) to about 0.5 mm.

The SiC ceramic part 20, the brass part 30, the Al foil 40 and the Ni foil 50 are pretreated. The pretreatment may include the step of polishing the surfaces of The SiC ceramic part 20, the brass part 30, the Al foil 40 and the Ni foil 50 by silicon carbide (SiC) sandpaper to produce smooth surfaces. Then, the SiC ceramic part 20, the brass part 30, the Al foil 40 and the Ni foil 50 are cleaned by placing them into an organic solution to remove grease from their surfaces. The organic solution can be ethanol, and/or other organic solvents. Then, the SiC ceramic part 20, the brass part 30, the Al foil 40 and the Ni foil 50 are rinsed with water and dried.

A clamping mold 70 is used to hold the SiC ceramic part 20, the brass part 30, the Al foil 40 and the Ni foil 50. The clamping mold 70 includes a pressing board 72, a corresponding supporting board 74 and a receiving board 76. The receiving board 76 defines a cavity 762 running through the upper/bottom surface to receive the SiC ceramic part 20, the brass part 30, the Al foil 40 and the Ni foil 50. The pressing board 72 and the corresponding supporting board 74 extend towards the cavity 762 from opposing directions and can be moved relative to the cavity 762 by a driving system such as hydraulic pressure system. The SiC ceramic part 20, the Al foil 40, the Ni foil 50 and the brass part 30 are placed into the cavity 762 and clamped by the pressing board 72 and the corresponding supporting board 74. The Al foil 40 and the Ni foil 50 are inserted between the SiC ceramic part 20 and the brass part 30. The Al foil 40 abuts against the SiC ceramic part 20, the Ni foil 50 abuts against the brass part 30. The pressing board 72 and the corresponding supporting board 74 from two opposite sides, brings the surfaces of the parts to be joined into tight contact, for compressing the SiC ceramic part 20, the Al foil 40, the Ni foil 50 and the brass part 30.

A hot press sintering device 100 including a chamber 101 is provided. The clamping mold 70 is placed into the chamber 101. The vacuum level inside the chamber 101 is set to about $10^{-3}$ Pa to about $9 \times 10^{-3}$ Pa. Argon (Ar) is fed into the chamber 101 to maintain the chamber 101 pressure in a range of about 0.3 MPa-0.6 MPa. The pressing board 72 and the corresponding supporting board 74 press toward each other at about 10 MPa to firmly clamp the SiC ceramic part 20 and the brass part 30. Then, the chamber 101 is heated at a rate of about 10 degrees Celsius per minute(° C./min)-20° C./min. When the temperature of the chamber 101 reaches to about 300° C., the clamping pressure applied by the boards 72,74 steadily increases, until the temperature of the chamber 101 reaches to about 700° C.-1000° C., and the clamping pressure reaches to about 10 MPa-50 MPa. The pressure and heat are maintained in their respective peak ranges for about 30 min-70 min, so that the Al foil 40 and the Ni foil 50 will chemically interact with each other, and the Al foil 40 chemically interacts with the SiC ceramic part 20, and the Ni foil 50 chemically interacts with the brass part 30. Accordingly, the SiC ceramic part 20 and the brass part 30 are connected by the Al foil 40 and the Ni foil 50 to form a composite article 10. The composite article 10 is removed after the chamber 101 is cooled.

Figure 2:
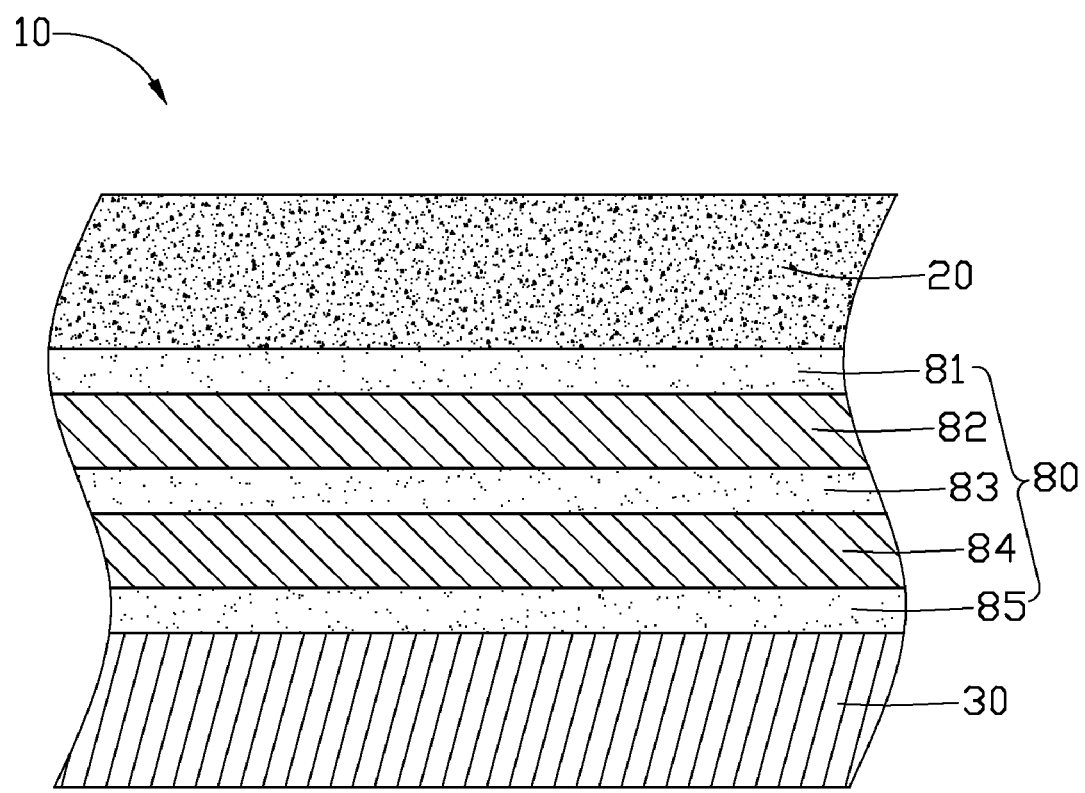
FIG. 2 is a cross-sectional view of an exemplary embodiment of the present article made by the present process.

Referring to FIG. 2, in the process of making the composite article 10, the Al foil 40 and the Ni foil 50 act as intermediate layers to form a connecting layer 80 that connect the SiC ceramic part 20 and the brass part 30. The heat expansion rate of SiC ceramic part 20 is approximately equal to that of the Al foil 40, thus the SiC ceramic part 20 can substantially connect with the Al foil 40. The heat expansion rate of the brass part 30 is approximately equal to that of the Ni foil 50, thus the brass part 30 can substantially connect to the Ni foil 50. Furthermore, the combination of the Al foil 40 and the Ni foil 50 to form the connecting layer 80 results in a connecting layer 80 having a rate of heat expansion that gradually changes from one end to the other. Therefore, the SiC ceramic part 20 is securely connected with the brass part 30 and more able to cope with temperature changes.

The composite article 10 manufactured by the present process includes the SiC ceramic part 20, the brass part 30 and a multi-layered connecting layer 80 connecting the SiC ceramic part 20 to the brass part 30. The connecting layer 80 is formed by placing the Al foil 40 and the Ni foil 50 between the SiC ceramic part 20 and the brass part 30, and then heating and pressing the SiC ceramic part 20 and the brass part 30 as previously described. The various layers of the connecting layer 80 result from differing chemical interaction between the brass part 30, Al foil 40, Ni foil 50, and SiC ceramic part 20. In particular, the connecting layer 80 includes:

a) a first transition layer 81: The first transition layer 81 mainly includes compounds comprising Al element and C element, and chemical compounds comprising Si element and Al element, such as $Al_2C_3$, etc. The compounds result from chemical reactions between adjacent portions of the SiC ceramic part 20 and Al foil 40;

b) a Al layer 82: The Al layer 82 results from portions of the Al foil 40 that do not chemically react with either the SiC ceramic part 20 or the Ni foil 50;

c) a second transition layer 83: The second transition layer 83 is located between the Al layer 82 and the Ni layer 84. The second transition layer 83 mainly includes chemical compounds comprising Al element and Ni element, and Ni with Al solid solutions. The compounds and solutions result from chemical reactions between adjacent portions to the Al foil 40 and Ni foil 50;

d) an Ni layer 84: The Ni layer 84 results from portions of the Ni foil 50 that do not chemically react with either the Al foil 40 or the brass part 30; and e) a third transition layer 85: The third transition layer 85 is located between the Ni layer 84 and the brass layer 30 and connects the Ni layer 84 and the brass layer 30. The third transition layer 85 mainly includes chemical compounds comprising Ni element and Cu element, and Ni with Cu solid solutions. The third transition layer 85 further includes some chemical compounds comprising Ni element and Zn element, and Ni with Zn solid solutions. The brass layer 30 generally includes zinc (Zn) element and the ratio of the Zn element in the brass is about below 10%. The compounds and solutions result from chemical reactions between adjacent portions to the Ni layer 84 and the brass layer 30.

The thermal expansion rate of the connecting layer 80 gradually changes from a value close to that of the SiC ceramic part 20 (in the area of the first transition layer 81) to a value close to that of brass part 30 (in the area of the third transition layer 85). This results in a composite article 10 well suited to temperature changes due to the gradual, rather than abrupt, changes in its internal thermal expansion rates.

Furthermore, the connecting layer 80 of the composite article 10 has no cracks or apertures, and has a smooth surface. The composite article 10 has high hardness, high temperature resistance, corrosion resistance, abrasion resistance, shear strength in a range from about 50 MPa to about 80 MPa, and tension strength in a range from about 60 MPa to about 100 MPa.

It is to be understood that even though numerous characteristics and advantages of the present embodiments have been set forth in the foregoing description, together with details of assemblies and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. A composite article, comprising:
   a SiC ceramic part,
   a brass part, and
   a connecting layer connecting the SiC ceramic part to the brass part, wherein the connecting layer is formed by placing a Al foil and a Ni foil between the SiC ceramic part and the brass part with the Al foil adjacent to the SiC part and the Ni foil adjacent to the brass part, then heating and pressing the SiC ceramic part, the brass part, the Al foil and the Ni foil, the connecting layer order including a first transition layer adjacent to the SiC part, a Al layer, a second transition layer, a Ni layer, and a third transition layer adjacent to the brass part, the first transition layer that is located between the SiC ceramic part and the Al layer mainly includes compounds comprising Al element and C element.

2. The composite article as claimed in claim 1, wherein the compounds include $Al_2C_3$.

3. The composite article as claimed in claim 1, wherein the second transition located between the Al layer and the Ni layer mainly includes compounds comprised of Al element and Ni element, and Ni—Al solid solutions.

4. The composite article as claimed in claim 1, wherein the third transition layer located between the Ni layer and the brass layer mainly includes Ni element and Cu element, and Ni—Cu solid solutions.

5. The composite article as claimed in claim 4, wherein the third transition layer further includes Ni element and Zn element, and Ni—Zn solid solutions.

* * * * *